(12) United States Patent
Matsuoto et al.

(10) Patent No.: US 10,138,970 B2
(45) Date of Patent: Nov. 27, 2018

(54) COIL SPRING

(75) Inventors: Takayuki Matsuoto, Ichihara (JP); Kazuhisa Michibata, Ichihara (JP); Satoshi Ieiri, Ichihara (JP); Takashi Yajima, Ichihara (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 0 days.

(21) Appl. No.: 13/807,100

(22) PCT Filed: Jun. 23, 2011

(86) PCT No.: PCT/JP2011/064484
§ 371 (c)(1),
(2), (4) Date: Dec. 27, 2012

(87) PCT Pub. No.: WO2012/002262
PCT Pub. Date: Jan. 5, 2012

(65) Prior Publication Data
US 2013/0099435 A1     Apr. 25, 2013

(30) Foreign Application Priority Data

Jun. 30, 2010   (JP) ................. 2010-150443

(51) Int. Cl.
*F16F 1/06* (2006.01)
*F16F 1/04* (2006.01)
*F16F 1/12* (2006.01)

(52) U.S. Cl.
CPC ............... *F16F 1/06* (2013.01); *F16F 1/047* (2013.01); *F16F 1/123* (2013.01)

(58) Field of Classification Search
CPC .. F16F 1/042; F16F 1/043; F16F 1/045; F16F 1/047; F16F 1/06; F16F 1/123
See application file for complete search history.

(56) References Cited

U.S. PATENT DOCUMENTS 1,523,225 A * 1/1925 Lukens ..................... 267/166
1,756,270 A * 4/1930 Whittenberger ............ 152/97
(Continued)

FOREIGN PATENT DOCUMENTS

EP          552858 A1 * 7/1993 ............... F16F 1/06
FR     2550295 A1    2/1985
(Continued)

OTHER PUBLICATIONS

Notice of Reasons for Rejection for Japanese Application No. 2012-163760, dated May 22, 2013.
(Continued)

*Primary Examiner* — Xuan Lan Nguyen
(74) *Attorney, Agent, or Firm* — Marshall, Gerstein & Borun LLP

(57) ABSTRACT

A coil spring has an effective section that functions as a spring when a load in a coil axis direction has been applied, end turn sections that are formed on both ends of the effective section, and rising sections that are formed between the effective section and the end turn sections, wherein the rising sections are formed in such a way that, when θ1 represents the pitch angle of the rising sections and θ2 represents the pitch angle of the effective section, pitch angle θ1>pitch angle θ2 holds true in at least one of the rising sections.

4 Claims, 9 Drawing Sheets

(56) References Cited

U.S. PATENT DOCUMENTS

| | | | |
|---|---|---|---|
| 2,668,278 A * | 2/1954 | Avery | 439/384 |
| 4,077,619 A | 3/1978 | Borlinghaus | |
| 4,561,640 A | 12/1985 | Enke et al. | |
| 4,728,088 A * | 3/1988 | Smith | 267/286 |
| 4,810,231 A * | 3/1989 | Weissenberger et al. | 464/68.4 |
| 4,953,835 A * | 9/1990 | Matsumoto et al. | 267/180 |
| 5,464,198 A * | 11/1995 | Yanko et al. | 267/167 |
| 6,193,225 B1 * | 2/2001 | Watanabe | 267/180 |
| 7,677,541 B2 * | 3/2010 | Ahn | 267/179 |
| 9,783,017 B2 | 10/2017 | Ogura et al. | |
| 2004/0123769 A1 | 7/2004 | Nishimura | |
| 2007/0216076 A1 * | 9/2007 | Ahn | 267/180 |
| 2009/0212476 A1 | 8/2009 | Knebel, III et al. | |

FOREIGN PATENT DOCUMENTS

| | | |
|---|---|---|
| JP | 49-17954 U | 2/1974 |
| JP | 50-38670 A | 4/1975 |
| JP | 59-199313 A | 11/1984 |
| JP | 1-128034 U | 5/1989 |
| JP | 2-51760 U | 2/1990 |
| JP | 9-14316 A | 1/1997 |
| JP | 10-184751 A | 7/1998 |
| JP | 2002257169 A | 9/2002 |
| JP | 2005-349447 A | 12/2005 |
| JP | 2006-044561 A | 2/2006 |
| JP | 2006-077904 A | 3/2006 |
| JP | 2006-200734 A | 8/2006 |
| JP | 2008-241043 A | 10/2008 |
| WO | WO-96/03593 A1 | 2/1996 |

OTHER PUBLICATIONS

Decision of Refusal for Japanese Application No. 2010-150443, dated Apr. 16, 2012.
International Preliminary Report on Patentability for Application No. PCT/JP2011/064484, dated Dec. 31, 2012.
International Search Report and Written Opinion for International Application No. PCT/JP2011/064484, dated Jul. 26, 2011.
Notice of Reasons for Rejection for Japanese Application No. 2010-150443, dated Aug. 25, 2011.
Office Action for Korean Patent Application No. 10-2013-7001866, dated Mar. 3, 2014.
English Translation of Notice of Reasons for Rejection from Japanese Patent Application No. 2012-163760 dated Jan. 20, 2015.
Search Report in European Application No. 11800727.7 dated Jun. 23, 2015.
Office Action in Indian Application No. 537/CHENP/2013 dated Nov. 9, 2017, 5 pages.

\* cited by examiner

PRIOR ART

PRIOR ART

PRIOR ART

PRIOR ART

COIL SPRING

TECHNICAL FIELD

The present invention pertains to a coil spring and particularly relates to an open end coil spring that is particularly suitably used as a track spring in a crawler undercarriage.

BACKGROUND ART

As a track spring that elastically supports an idler and exhibits a cushioning function in a crawler undercarriage attached to an excavator or the like, there is a track spring in which the spring pitch is made different in some coil sections of the entire coil spring with respect to other coil sections so as to form bite preventing sections that can prevent the biting of earth, sand, and the like (JP-A No. 2006-044561).

The above-described track spring is also an open end coil spring that has gaps between its end sections and its first coil sections in a free state.

DISCLOSURE OF INVENTION

Technical Problem

However, in a conventional open end coil spring, the gaps between the spring end sections and the first coil sections are not sufficient, so there have been problems in that, when shot peening has been administered after the wire rod has been wound, places not struck by the shot arise, and fretting and noises arise during use.

It is an object of the present invention to provide an open end coil spring on which reliable shot peening can be administered, in which fretting and noises do not arise during use, and which is resource-saving and made lightweight in correspondence to environmental problems in recent years.

Solution to Problem

An invention according to claim 1 relates to a coil spring comprising: an effective section that functions as a spring when a load in a coil axis direction has been applied; end turn sections that are formed on both ends of the effective section; and rising sections that are formed between the effective section and the end turn sections, wherein the rising sections are formed in such a way that, when $\theta 1$ represents the pitch angle of the rising sections and $\theta 2$ represents the pitch angle of the effective section, pitch angle $\theta 1$ > pitch angle $\theta 2$ holds true in at least one of the rising sections.

In a first embodiment of the invention, the gaps between the end turn sections and the first coil sections including the rising sections are taken larger than those in a conventional open end coil spring, so when shot peening has been administered, portion in which the striking of the shot is insufficient do not arise. Moreover, there is no contact between the end turn sections and the rising sections even at the time of usage at a maximum load, so there is provided a coil spring that can effectively prevent the occurrence of fretting and noises during usage.

A coil spring according to a second embodiment relates to the coil spring according to the first embodiment, wherein sections forming the end turn sections in the wire rod forming the coil spring are made into tapered sections whose dimension in a direction orthogonal to the winding direction of the wire rod becomes smaller toward their termini, and when w represents the width and t represents the thickness of the wire rod at end faces of the tapered sections, $1 < w/t \leq 1.6$.

In a coil spring in which the end turn sections are made into tapered sections, the end turn sections become unstable in a case where w/t at the end faces is equal to or less than 1 and the rigidity of the end turn sections drops when w/t at the end faces exceeds 1.6, and in both cases it becomes easier for the coil spring to collapse, but in the coil spring of the second embodiment, w/t at the end faces has the relationship of $1 < w/t \leq 1.6$, so there is provided a coil spring in which the rigidity of the end turn sections in the coil axis direction is high.

A coil spring according to a third embodiment relates to the coil spring according to the first or second embodiment, wherein the tapered sections are made equal to or greater than 0.5 turns and equal to or less than 0.6 turns.

In order for an open end coil spring not to collapse, it is necessary that the length of the tapered sections be equal to or greater than 0.5 turns, but when the tapered sections reach as far as the rising sections, there is the danger that the coil spring will break there, so it is preferred that the length of the tapered sections be equal to or less than 0.6 turns. In the invention of claim 3, the length of the tapered sections is made equal to or greater than 0.5 turns and equal to or less than 0.6 turns, so collapse can be prevented and a lightweight coil spring is provided.

A coil spring according to a fourth embodiment corresponds to the coil spring according to any one of the first, second, or third embodiments, wherein at least one of the end turn sections is given a pigtail curl.

According to the fourth embodiment, by giving the end turn section a pigtail curl, there is provided a coil spring in which the gap between the end turn section that has been given the pigtail curl and the first coil section adjacent to the end turn section does not easily close.

Advantageous Effects of Invention

As described above, according to the present invention, there is provided an open end coil spring on which reliable shot peening can be administered, in which fretting and noises do not arise during use, and which is resource-saving and made lightweight.

BEST MODE FOR CARRYING OUT THE INVENTION

1. Exemplary Embodiment 1

An example of a coil spring pertaining to the present invention will be described below.

Figure 1:
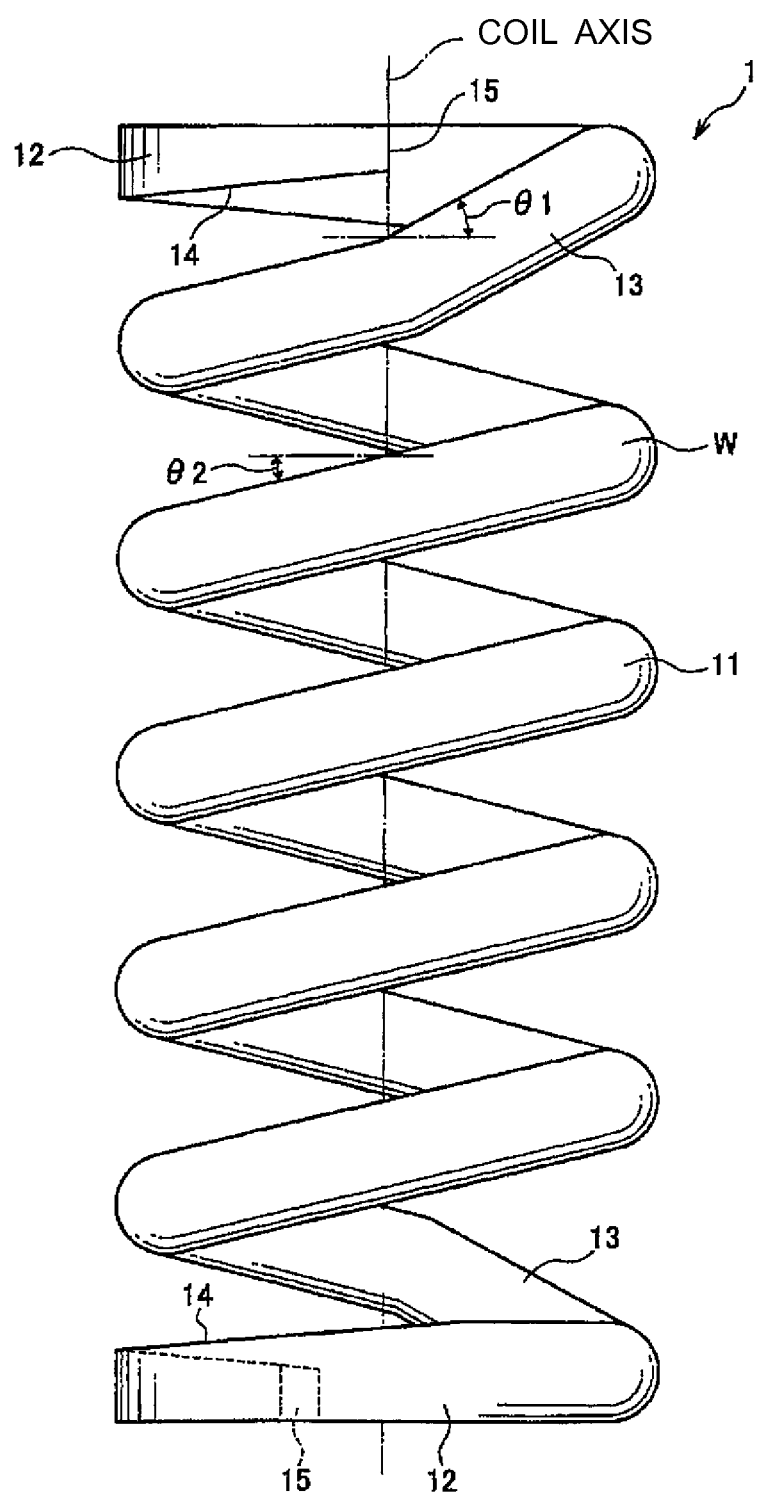
FIG. 1 is a side view showing the configuration of a coil spring pertaining to exemplary embodiment 1.

A coil spring 1 pertaining to exemplary embodiment 1 is an open end coil spring and is a coil spring that is formed by winding wire rod W into coils; as shown in FIG. 1, the coil spring 1 has an effective section 11 that functions as a spring when a load has been applied in a coil axis direction, end turn sections 12 that are formed by annularly winding the wire rod W at a pitch angle of 0 at both ends of the effective section 11, and rising sections 13 at which the wire rod rises from the end turn sections 12 toward the effective section 11.

Figure 2:
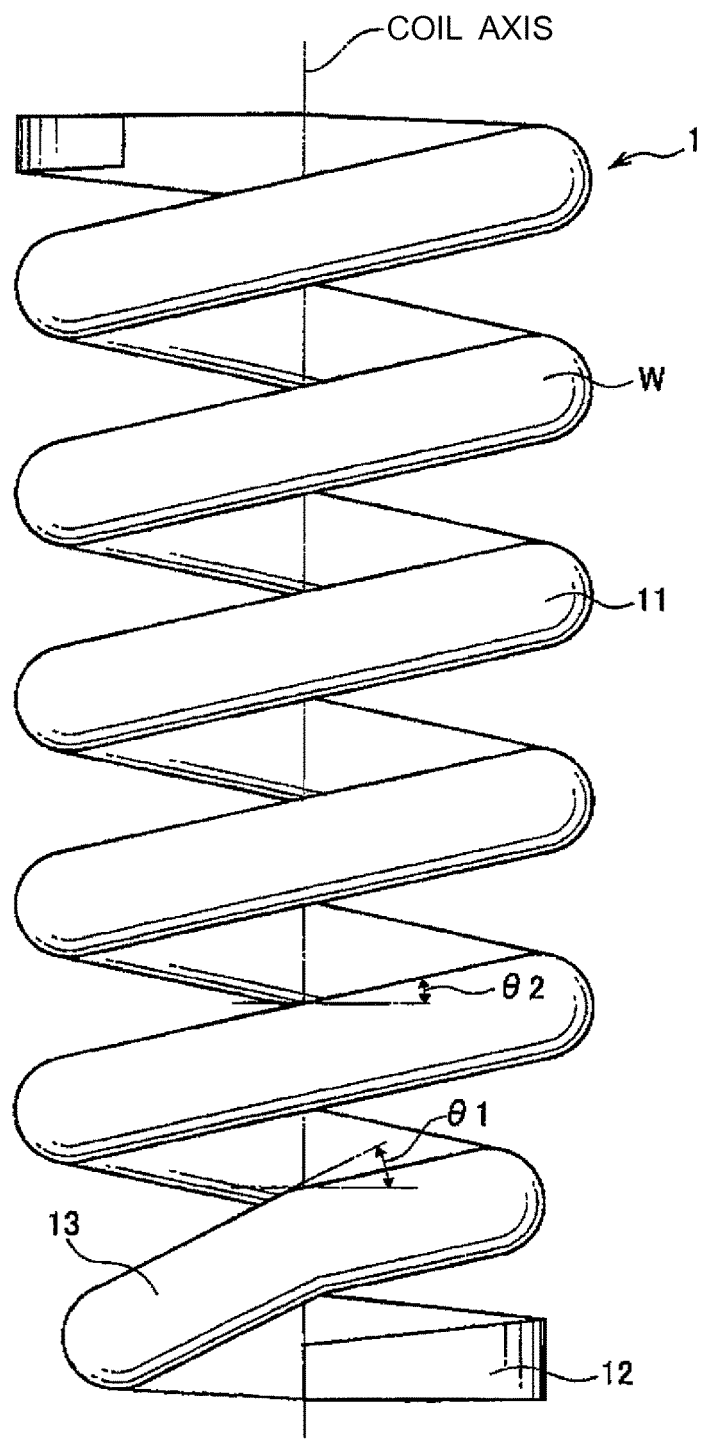
FIG. 2 is a side view showing a configuration regarding an example in which an end turn section on one side is given a pigtail curl and a rising section is formed in the coil spring pertaining to exemplary embodiment 1.

The rising section 13 may be disposed on both of the end turn sections 12 as shown in FIG. 1 or may be disposed just on one of the end turn sections 12 as shown in FIG. 2.

As shown in FIG. 1 and FIG. 2, the rising sections 13 and the effective section 11 are formed in such a way that, when $\theta 1$ represents the pitch angle of the rising sections 13 and $\theta 2$ represents the pitch angle of the effective section 11, the relationship of pitch angle $\theta 1$> pitch angle $\theta 2$ holds true.

Figure 3:
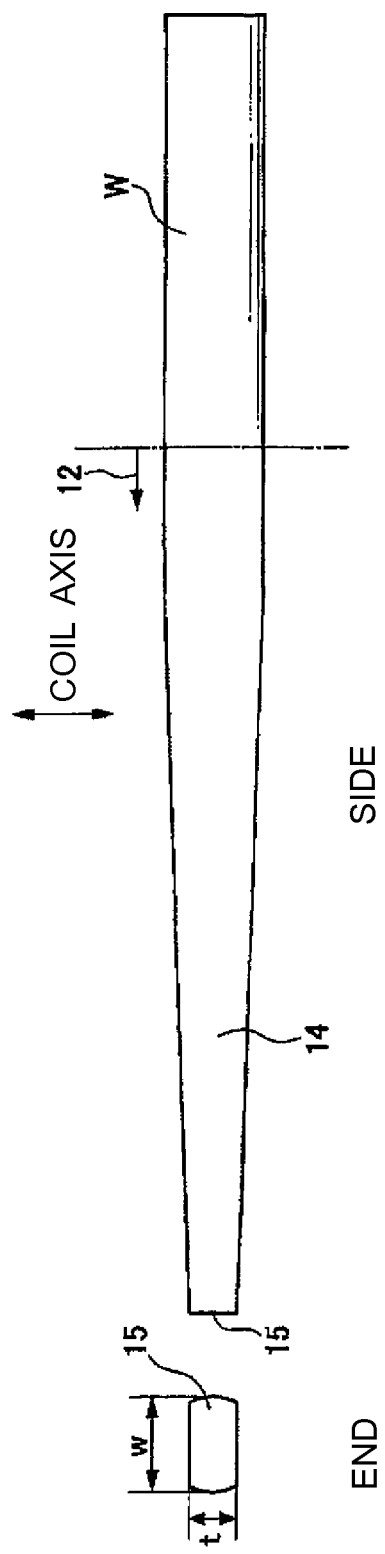
FIG. 3 is a side view and an end view showing the configuration of a tapered section of the wire rod forming the coil spring of exemplary embodiment 1.
Figure 4:
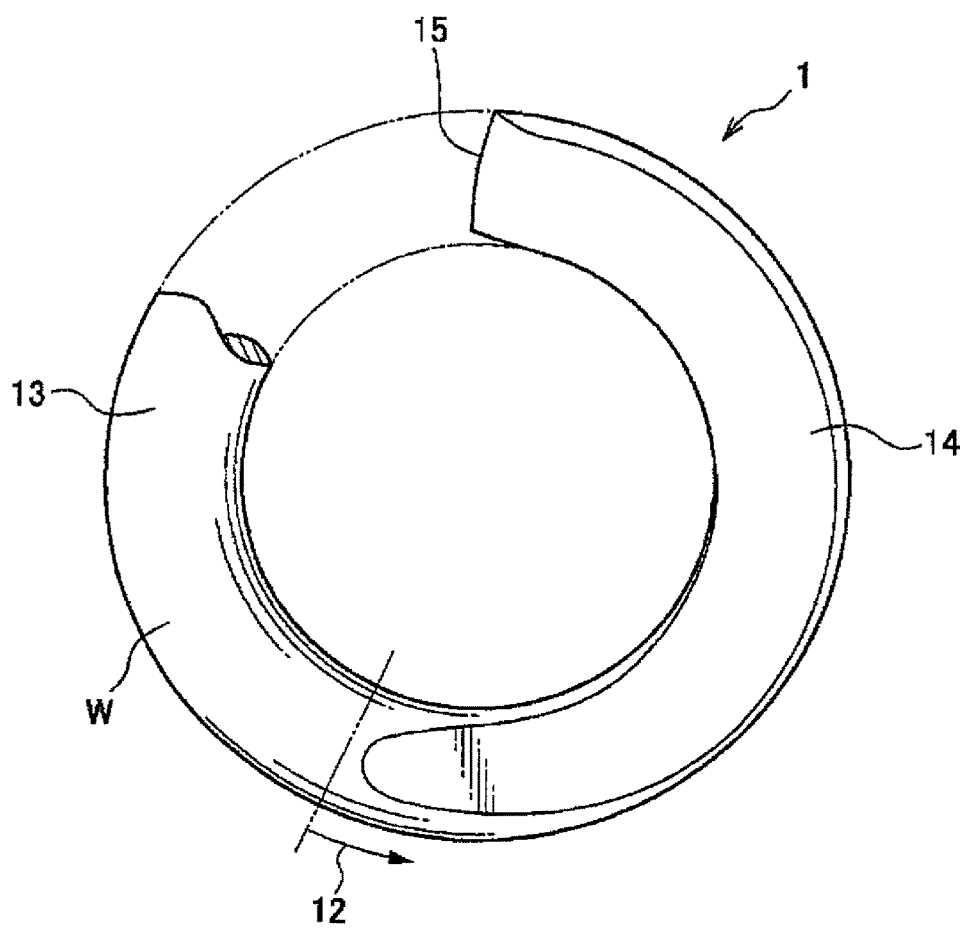
FIG. 4 is an end view of the coil spring pertaining to exemplary embodiment 1.

Tapered sections 14, which are sections that are made into the end turn sections 12 in the wire rod W, are given a tapered shape whose dimension along the coil axis direction becomes shorter toward end faces 15 as shown in FIG. 3 and FIG. 4. Additionally, the tapered sections 14 are tapered in such a way that, at the end faces 15 of the tapered sections 14, a ratio w/t between a width w and a thickness t of the wire rod W is in the range of $1<w/t\leq 1.6$.

The tapered sections 14 are given a length corresponding to equal to or greater than 0.5 turns and equal to or less than 0.6 turns.

As shown in FIG. 4, which shows the ends of the coil spring 1, the end turn sections 12 are also made equal to or greater than 0.5 turns and equal to or less than 0.6 turns and are made equal to or less than 1 turn even when the rising sections 13 are added to the end turn sections 12. However, if the tapered sections 14 exceed the end turn sections 12 and reach as far as the rising sections 13, there is the risk that the coil spring will break there, so the length of the tapered sections 14 is made shorter than the length of the end turn sections 12, and it is ensured that the tapered sections 14 do not reach as far as the rising sections 13.

The gauge of the wire rod W can be appropriately decided in accordance with the intended use of the coil spring 1. For example, if the coil spring is a coil spring for construction machinery such as a track spring, it is preferred that the diameter of the wire rod W be about 25 mm to 90 mm.

Figure 5:
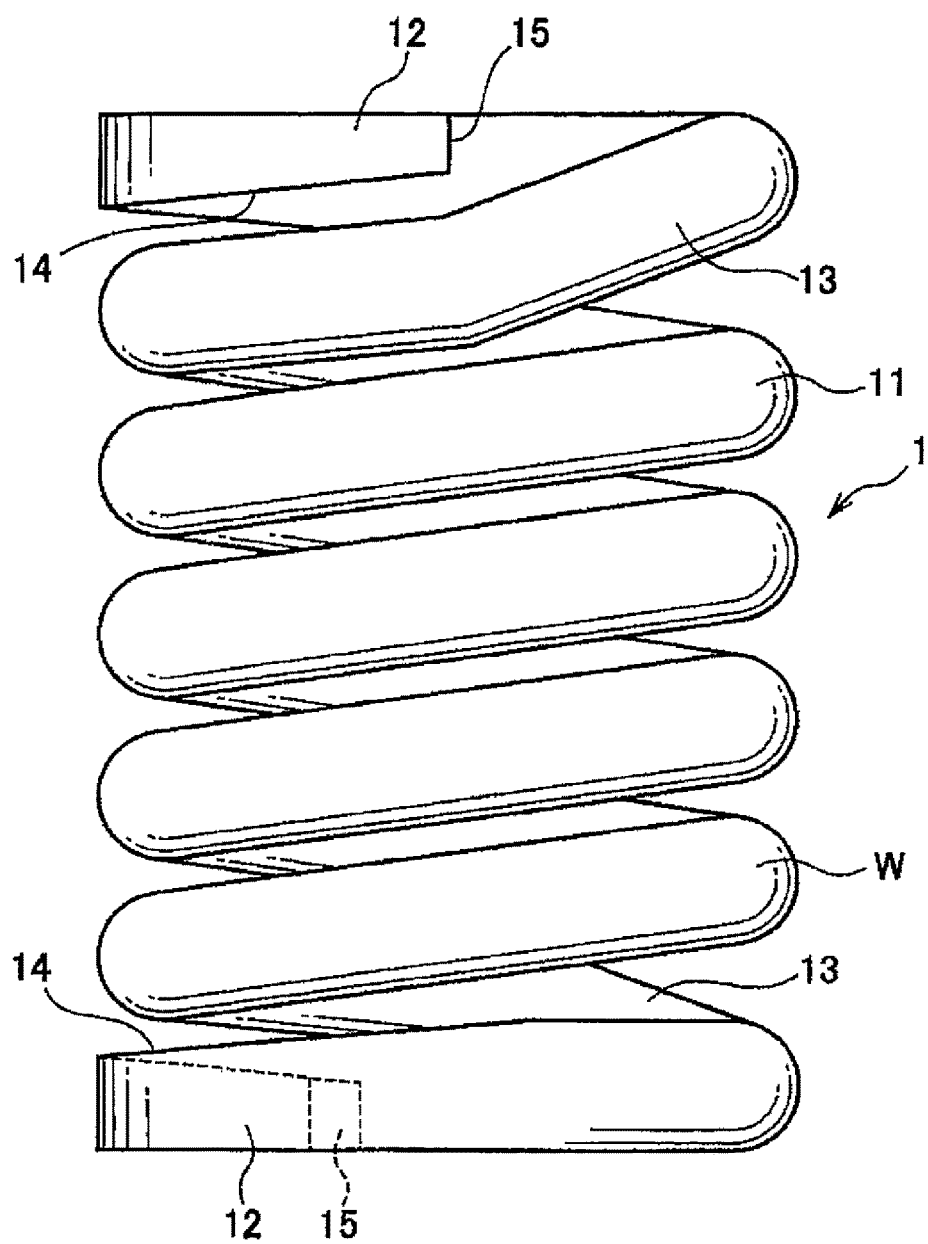
FIG. 5 is a side view showing a state in which the coil spring pertaining to embodiment 1 has been compressed along its coil axis.
Figure 6:
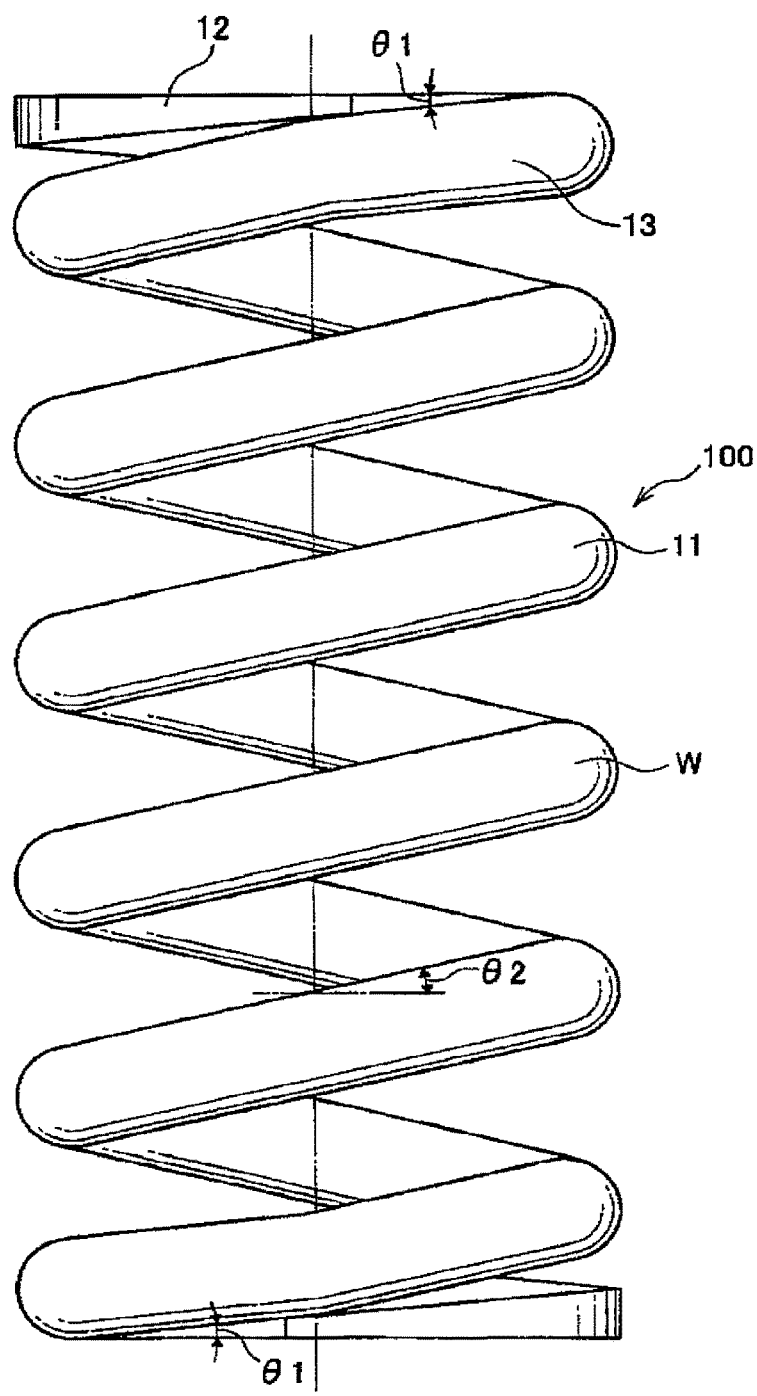
FIG. 6 is a side view showing the configuration of a conventional open end coil spring.
Figure 7:
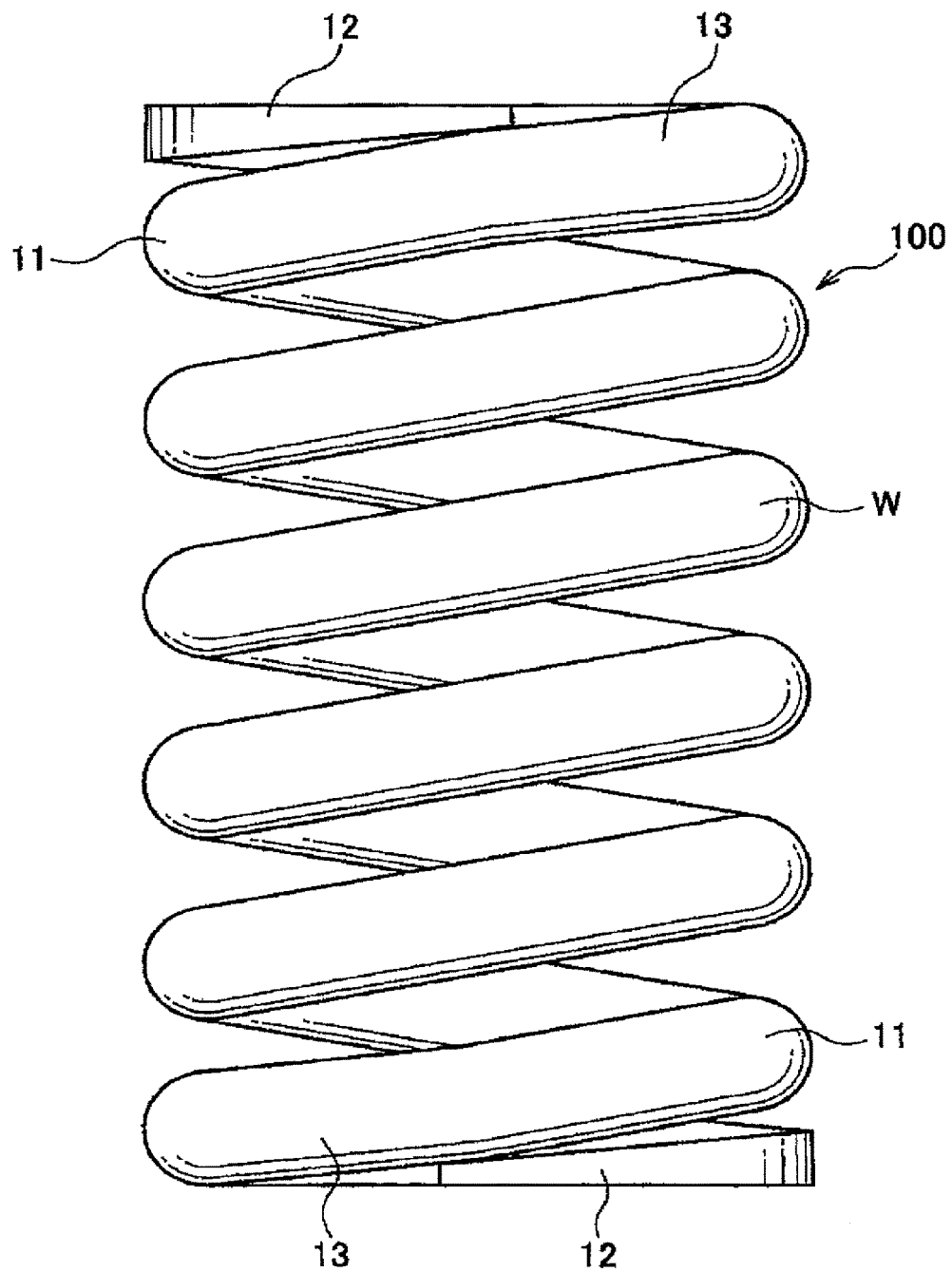
FIG. 7 is a side view showing a state in which the coil spring shown in FIG. 6 has been compressed along its coil axis.

FIG. 5 shows a state in which a load in the coil axis direction has been applied to the coil spring 1 of embodiment 1 so that the coil spring 1 has become compressed. On the other hand, FIG. 6 shows a conventional open end coil spring 100 in which the pitch angle $\theta 1$ of the rising sections 13 is smaller than the pitch angle $\theta 2$ of the effective section 11, and FIG. 7 shows a state in which a load in the coil axis direction has been applied to the coil spring 100 so that the coil spring 100 has become compressed.

As shown in FIG. 5, in the coil spring 1 of embodiment 1, even in the state in which the effective section 11 has been compressed to a state in which the coils substantially contact each other, gaps exist between the end turn sections 12 and the rising sections 13. In contrast, in the coil spring 100, as shown in FIG. 7, the end turn sections 12 and the rising sections 13 contact each other before the effective section 11 is sufficiently fully compressed.

Consequently, whereas in the coil spring 1 of embodiment 1 the occurrence of fretting and noises resulting from the end turn sections 12 contacting the rising sections 13 is prevented, in the coil spring 100 the end turn sections 12 contact the rising sections 13 every time the effective section 11 is compressed by a load, so fretting occurs and noises are generated.

Further, in the coil spring 1 of exemplary embodiment 1, larger gaps can be taken between the end turn sections 12 and the first coil sections including the rising sections 13 than the conventional open end coil spring 100, so the number of coil turns with respect to spring heights required by customers can be reduced, and the coil spring is made lightweight.

Moreover, reliable shot peening and coating are performed at the time of manufacturing, and contact pressure is reduced and damage to the coated film is prevented at the time of use, so the risk of a corrosive break is significantly reduced.

Figure 8:
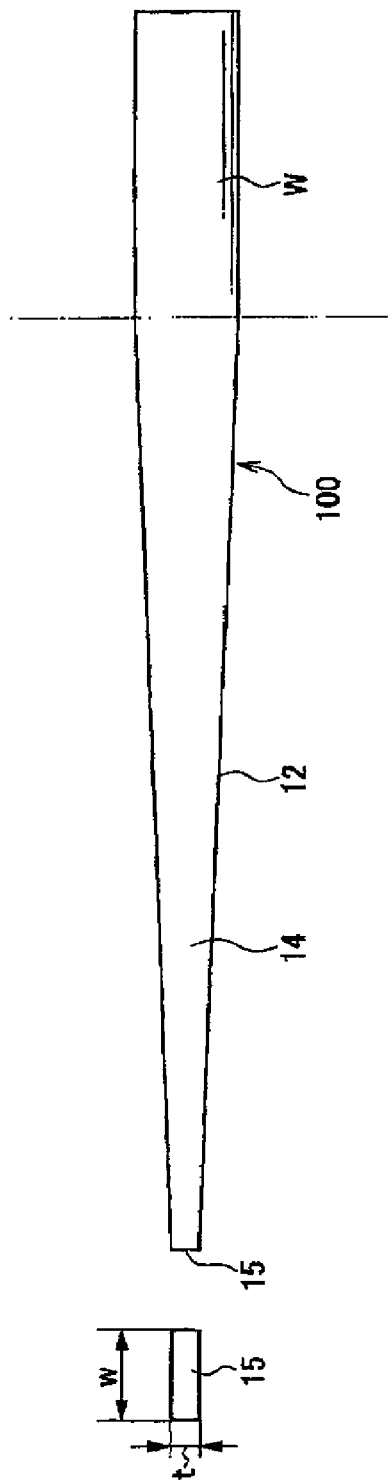
FIG. 8 is a side view and an end view showing the configuration of a tapered section of the wire rod forming the coil spring of FIG. 6.
Figure 9:
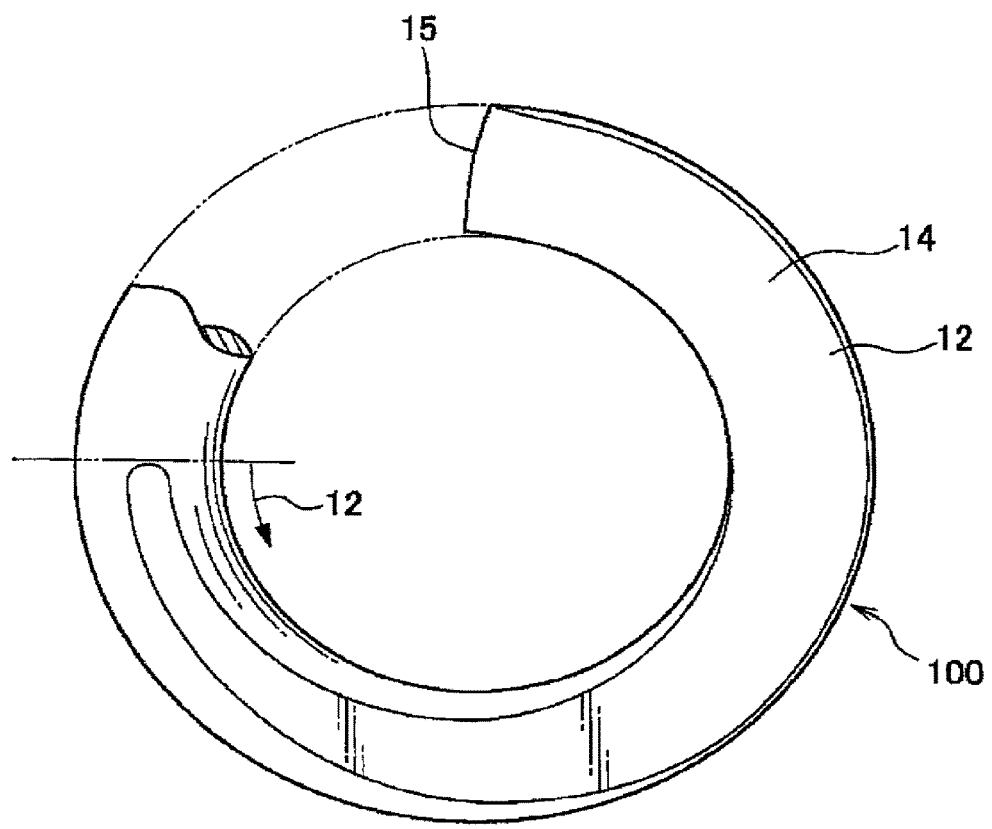
FIG. 9 is an end view of the coil spring of FIG. 6.

In addition, in the coil spring 1 of exemplary embodiment 1, as shown in FIG. 3, the ratio between the width w and the thickness t of the end faces 15 of the wire rod W is greater than 1 and equal to or less than 1.6 and the length of the tapered sections is made equal to or greater than 0.5 turns and equal to or less than 0.6 turns, but in the conventional open end coil spring 100, w/t exceeds 1.6 as shown in FIG. 8 and the length of the tapered sections exceeds 0.6 turns as shown in FIG. 9. Consequently, in the coil spring 1 of exemplary embodiment 1, in contrast to the conventional open end coil spring 100, the rigidity of the end turn sections 12 in the coil axis direction is high, so it is difficult for the end turn sections 12 to deform. Consequently, a stable spring characteristic is obtained.

REFERENCE SIGNS LIST

1 Coil Spring
11 Effective Section
12 End Turn Sections
13 Rising Sections
14 End Sections
15 End Faces

The invention claimed is:

1. A coil spring comprising:
end turn sections that are formed on both ends of the coil spring;
an effective section that is formed between the end turn sections that functions as a spring when a load in a coil axis direction has been applied; and
rising sections that are formed between the effective section and the end turn sections,
wherein:
the rising sections are formed in such a way that, when $\theta 1$ represents a pitch angle of the rising sections and $\theta 2$ represents a pitch angle of the effective section, pitch angle $\theta 1$>pitch angle $\theta 2$ holds true in at least one of the rising sections, and
a diameter of a wire rod forming the coil spring is 25 mm to 90 mm,
wherein the rising sections are configured such that when the effective section is compressed such that the coils of the effective section effectively contact each other, gaps exist between the end turn sections and the rising sections, wherein each end turn section comprises a tapered section having a dimension in a direction orthogonal to a winding direction of the wire rod that becomes smaller toward termini of the tapered sections, and wherein the tapered sections are made equal to or greater than 0.5 turns and equal to or less than 0.6 turns.

2. The coil spring according to claim 1, wherein when w represents a width and t represents a thickness of the wire rod at end faces of the tapered sections, $1 < w/t \leq 1.6$.

3. The coil spring according to claim 1, wherein at least one of the end turn sections is given a pigtail curl.

4. The coil spring according to claim 1, wherein the effective section comprises a plurality of coils, the coil spring being substantially evenly separated apart from one another.

* * * * *